US009524254B2

United States Patent
Jeddeloh et al.

(10) Patent No.: US 9,524,254 B2
(45) Date of Patent: Dec. 20, 2016

(54) MULTI-SERIAL INTERFACE STACKED-DIE MEMORY ARCHITECTURE

(71) Applicant: Micron Technology, Inc., Boise, ID (US)

(72) Inventors: Joe M. Jeddeloh, Shoreview, MN (US); Paul A. LaBerge, Shoreview, MN (US)

(73) Assignee: Micron Technology, Inc., Boise, ID (US)

(*) Notice: Subject to any disclaimer, the term of this patent is extended or adjusted under 35 U.S.C. 154(b) by 156 days.

(21) Appl. No.: 14/456,839

(22) Filed: Aug. 11, 2014

(65) Prior Publication Data

US 2014/0351503 A1   Nov. 27, 2014

Related U.S. Application Data

(63) Continuation of application No. 13/179,156, filed on Jul. 8, 2011, now Pat. No. 8,806,131, which is a
(Continued)

(51) Int. Cl.
  *G06F 13/00* (2006.01)
  *G06F 13/16* (2006.01)
  *G06F 13/40* (2006.01)

(52) U.S. Cl.
  CPC ....... *G06F 13/1668* (2013.01); *G06F 13/1684* (2013.01); *G06F 13/4022* (2013.01); *G06F 2213/16* (2013.01); *Y02B 60/1228* (2013.01); *Y02B 60/1235* (2013.01)

(58) Field of Classification Search
  USPC ... 370/419–464; 711/105–154; 713/300–311
  See application file for complete search history.

(56) References Cited

U.S. PATENT DOCUMENTS 5,347,428 A   9/1994  Carson et al.
5,432,729 A   7/1995  Carson et al.
(Continued)

FOREIGN PATENT DOCUMENTS

CN   1540665 A    10/2004
CN   101364593 A   2/2009
(Continued)

OTHER PUBLICATIONS

"U.S. Appl. No. 12/750,448, Notice of Allowance mailed Jan. 16, 2015", 5 pgs.
(Continued)

*Primary Examiner* — Man Phan
(74) *Attorney, Agent, or Firm* — Schwegman Lundberg & Woessner, P.A.

(57) ABSTRACT

Systems and methods disclosed herein substantially concurrently transfer a plurality of streams of commands, addresses, and/or data across a corresponding plurality of serialized communication link interfaces (SCLIs) between one or more originating devices or destination devices such as a processor and a switch. At the switch, one or more commands, addresses, or data corresponding to each stream can be transferred to a corresponding destination memory vault controller (MVC) associated with a corresponding memory vault. The destination MVC can perform write operations, read operations, and/or memory vault housekeeping operations independently from concurrent operations associated with other MVCs coupled to a corresponding plurality of memory vaults.

20 Claims, 8 Drawing Sheets

Related U.S. Application Data continuation of application No. 12/261,942, filed on Oct. 30, 2008, now Pat. No. 7,978,721, which is a continuation-in-part of application No. 12/166,814, filed on Jul. 2, 2008, now Pat. No. 8,756,486, and a continuation-in-part of application No. 12/166,871, filed on Jul. 2, 2008, now Pat. No. 8,289,760, and a continuation-in-part of application No. 12/176,951, filed on Jul. 21, 2008, now Pat. No. 7,855,931.

(56) References Cited

U.S. PATENT DOCUMENTS

| | | |
|---|---|---|
| 5,807,791 A | 9/1998 | Bertin et al. |
| 5,815,427 A | 9/1998 | Cloud et al. |
| 5,907,566 A | 5/1999 | Benson et al. |
| 5,914,953 A | 6/1999 | Krause et al. |
| 5,943,692 A | 8/1999 | Marberg et al. |
| 5,973,392 A | 10/1999 | Senba et al. |
| 6,046,945 A | 4/2000 | Su et al. |
| 6,047,002 A | 4/2000 | Hartmann et al. |
| 6,081,463 A | 6/2000 | Shaffer et al. |
| 6,154,851 A | 11/2000 | Sher et al. |
| 6,201,733 B1 | 3/2001 | Hiraki et al. |
| 6,407,283 B2 | 6/2002 | Couves et al. |
| 6,438,029 B2 | 8/2002 | Hiraki et al. |
| 6,582,992 B2 | 6/2003 | Poo et al. |
| 6,661,712 B2 | 12/2003 | Hiraki et al. |
| 6,754,117 B2 | 6/2004 | Jeddeloh |
| 6,778,404 B1 | 8/2004 | Bolken et al. |
| 6,791,832 B2 | 9/2004 | Budny |
| 6,897,096 B2 | 5/2005 | Cobbley et al. |
| 7,009,872 B2 * | 3/2006 | Alva .............. G06F 3/061 |
| | | 365/158 |
| 7,124,200 B2 | 10/2006 | Sato et al. |
| 7,200,021 B2 | 4/2007 | Raghuram |
| 7,257,129 B2 * | 8/2007 | Lee .............. H04L 47/10 |
| | | 365/230.05 |
| 7,279,795 B2 | 10/2007 | Periaman et al. |
| 7,317,256 B2 | 1/2008 | Williams et al. |
| 7,477,545 B2 * | 1/2009 | Tu .............. G11C 29/88 |
| | | 365/185.05 |
| 7,496,719 B2 | 2/2009 | Peterson et al. |
| 7,526,597 B2 * | 4/2009 | Perego .............. G06F 13/1684 |
| | | 711/105 |
| 7,623,365 B2 | 11/2009 | Jeddeloh |
| 7,701,252 B1 * | 4/2010 | Chow .............. H01L 25/0657 |
| | | 326/101 |
| 7,715,255 B2 * | 5/2010 | Tu .............. H01L 22/20 |
| | | 365/185.04 |
| 7,855,931 B2 | 12/2010 | Laberge et al. |
| 7,964,916 B2 | 6/2011 | Or-bach et al. |
| 7,978,721 B2 | 7/2011 | Jeddeloh et al. |
| 8,060,774 B2 * | 11/2011 | Smith .............. G06F 11/1076 |
| | | 714/6.22 |
| 8,063,491 B2 | 11/2011 | Hargan |
| 8,065,550 B2 | 11/2011 | Kim et al. |
| 8,120,958 B2 | 2/2012 | Bilger et al. |
| 8,127,204 B2 | 2/2012 | Hargan |
| 8,139,430 B2 | 3/2012 | Buchmann et al. |
| 8,233,303 B2 | 7/2012 | Best et al. |
| 8,281,074 B2 | 10/2012 | Jeddeloh |
| 8,294,159 B2 | 10/2012 | Or-bach et al. |
| 8,364,901 B2 * | 1/2013 | Jeddeloh .............. G06F 1/3203 |
| | | 711/114 |
| 8,476,735 B2 | 7/2013 | Hsu et al. |
| 8,806,131 B2 | 8/2014 | Jeddeloh et al. |
| 9,105,323 B2 * | 8/2015 | Jeddeloh .............. G06F 1/3225 |
| 9,123,552 B2 | 9/2015 | Keeth et al. |
| 2002/0191475 A1 | 12/2002 | Lee et al. |
| 2003/0197281 A1 | 10/2003 | Farnworth et al. |
| 2004/0164412 A1 | 8/2004 | Bolken et al. |
| 2004/0250046 A1 | 12/2004 | Gonzalez et al. |
| 2004/0257847 A1 | 12/2004 | Matsui et al. |
| 2005/0081012 A1 | 4/2005 | Gillingham et al. |
| 2005/0162897 A1 | 7/2005 | Alva |
| 2005/0189639 A1 | 9/2005 | Tanie et al. |
| 2006/0036827 A1 | 2/2006 | Dell et al. |
| 2006/0055020 A1 | 3/2006 | Bolken et al. |
| 2006/0126369 A1 | 6/2006 | Raghuram |
| 2007/0005876 A1 | 1/2007 | Ikeda et al. |
| 2007/0045780 A1 | 3/2007 | Akram et al. |
| 2007/0058410 A1 | 3/2007 | Rajan |
| 2007/0067826 A1 | 3/2007 | Conti |
| 2007/0070669 A1 | 3/2007 | Tsern |
| 2007/0075734 A1 | 4/2007 | Ramos et al. |
| 2007/0132085 A1 | 6/2007 | Shibata et al. |
| 2007/0220207 A1 * | 9/2007 | Black .............. G06F 12/084 |
| | | 711/118 |
| 2007/0290315 A1 | 12/2007 | Emma et al. |
| 2008/0077853 A1 | 3/2008 | Kriegesmann |
| 2008/0201548 A1 * | 8/2008 | Przybylski .............. G06F 13/4243 |
| | | 711/171 |
| 2009/0059641 A1 | 3/2009 | Jeddeloh |
| 2009/0161402 A1 | 6/2009 | Oh et al. |
| 2009/0210600 A1 | 8/2009 | Jeddeloh |
| 2009/0319703 A1 | 12/2009 | Chung |
| 2010/0005217 A1 | 1/2010 | Jeddeloh |
| 2010/0005238 A1 | 1/2010 | Jeddeloh et al. |
| 2010/0070696 A1 * | 3/2010 | Blankenship .............. G06F 13/4243 |
| | | 711/105 |
| 2010/0078829 A1 | 4/2010 | Hargan |
| 2010/0121994 A1 | 5/2010 | Kim et al. |
| 2010/0191999 A1 | 7/2010 | Jeddeloh |
| 2010/0211745 A1 | 8/2010 | Jeddeloh |
| 2011/0090004 A1 | 4/2011 | Schuetz |
| 2011/0148469 A1 | 6/2011 | Ito et al. |
| 2011/0246746 A1 | 10/2011 | Keeth et al. |
| 2011/0264858 A1 | 10/2011 | Jeddeloh et al. |
| 2015/0091189 A1 | 4/2015 | Keeth et al. |

FOREIGN PATENT DOCUMENTS

| | | |
|---|---|---|
| CN | 102822966 A | 12/2012 |
| CN | 101946245 B | 1/2014 |
| CN | 103761204 A | 4/2014 |
| EP | 0606653 A1 | 7/1994 |
| JP | 61196565 A | 8/1986 |
| JP | 6251172 A | 9/1994 |
| JP | 11194954 A | 7/1999 |
| JP | 2002259322 A | 9/2002 |
| JP | 2004327474 A | 11/2004 |
| JP | 2005004895 A | 6/2005 |
| JP | 2005244143 A | 9/2005 |
| JP | 2006301863 A | 11/2006 |
| JP | 2006330974 A | 12/2006 |
| JP | 2007129699 A | 5/2007 |
| JP | 2007140948 A | 6/2007 |
| JP | 2008140220 A | 6/2008 |
| JP | 2010538358 A | 12/2010 |
| JP | 2011508936 A | 3/2011 |
| JP | 2011527041 A | 10/2011 |
| TW | 358907 | 5/1999 |
| TW | I282557 B | 6/2007 |
| TW | I299499 B | 8/2008 |
| TW | 201220374 A | 5/2012 |
| WO | WO-2007095080 A2 | 8/2007 |
| WO | WO-2008076790 A2 | 6/2008 |
| WO | WO-2009032153 A2 | 3/2009 |
| WO | WO-2009105204 A2 | 8/2009 |
| WO | WO-2009105204 A3 | 8/2009 |
| WO | WO-2010051461 A1 | 5/2010 |
| WO | WO-2011126893 A2 | 10/2011 |
| WO | WO-2011126893 A3 | 10/2011 |

OTHER PUBLICATIONS

"U.S. Appl. No. 12/750,448, Notice of Allowance mailed Apr. 28, 2015", 5 pgs.

"U.S. Appl. No. 12/750,448, Notice of Allowance mailed Aug. 20, 2014", 5 pgs.

(56) References Cited

OTHER PUBLICATIONS

"U.S. Appl. No. 12/750,448, Supplemental Notice of Allowability mailed Feb. 2, 2015", 2 pgs.
"U.S. Appl. No. 14/563,222, Non Final Office Action mailed Apr. 10, 2015", 9 pgs.
"U.S. Appl. No. 14/563,222, Notice of Allowance mailed Oct. 29, 2015", 5 pgs.
"U.S. Appl. No. 14/563,222, Response filed Jul. 2, 2015 to Non Final Office Action mailed Apr. 10, 2015", 9 pgs.
"Chinese Application No. 200980148407.6, Office Action mailed Dec. 22, 2014", W/ English Translation, 6 pgs.
"Chinese Application Serial No. 200980148407.6, Response filed Mar. 4, 2015 to Office Action mailed Dec. 22, 2014", W/ English Claims, 15 pgs.
"Chinese Application Serial No. 200980148407.6, Response filed Aug. 22, 2014 to Office Action mailed Jun. 11, 2014", W/ English Claims, 11 pgs.
"Chinese Application Serial No. 201180017420.5 Response filed May 18, 2015 to Office Action mailed Jan. 5, 2015", With the English claims, 62 pgs.
"Chinese Application Serial No. 201180017420.5, Office Action mailed Jan. 5, 2015", W/ English Translation, 11 pgs.
"Chinese Application Serial No. 201180017420.5, Office Action mailed Sep. 17, 2015", w/ English Translation, 16 pgs.
"Chinese Application Serial No. 201180017420.5, Response filed Dec. 1, 2015 to Office Action mailed Sep. 17, 2015", (English Translation of Claims), 25 pgs.
"International Application Serial No. PCT/US2009/062799, International Preliminary Report on Patentability mailed May 3, 2011", 5 pgs.
"Japanese Application Serial No. 2013-502805, Decision of Rejection mailed Jan. 12, 2015", W/ English Translation, 15 pgs.
"Japanese Application Serial No. 2013-502805, Office Action mailed Apr. 14, 2015", W/ English Translation, 7 pgs.
"Japanese Application Serial No. 2013-502805, Response filed Jul. 9, 2015 to Office Action mailed Apr. 7, 2015", w/ English Claims, 25 pgs.
"Korean Application Serial No. 10-2011-7012151 Response filed Jan. 26, 2015 to Office Action mailed Nov. 25, 2014", With the English claims, 34 pgs.
"Korean Application Serial No. 10-2011-7012151, Office Action mailed Nov. 25, 2014", W/ English Claims, 5 pgs.
"Taiwanese Application Serial No. 098137010 Response filed Jan. 30, 2015 to Office Action mailed Dec. 17, 2014", With the English claims, 10 pgs.
"Taiwanese Application Serial No. 098137010, Office action mailed Dec. 28, 2014", W/ English Translation, 12 pgs.
"Chinese Application Serial No. 200980105675.X, Office Action mailed Jun. 18, 2013", w/English Translation, 5 pgs.
"Chinese Application Serial No. 200980105675.X, Office Action mailed Aug. 27, 2012", w/English Translation, 17 pgs.
"Chinese Application Serial No. 200980105675.X, Response filed Mar. 4, 2013 to Office Action mailed Aug. 27, 2012", w/English Claims, 11 pgs.
"Chinese Application Serial No. 200980105675.X, Response filed Aug. 28, 2013 to Office Action mailed Jun. 18, 2013", w/English Claims, 11 pgs.
"Chinese Application Serial No. 200980148407.6, Office Action mailed Jun. 11, 2014", w/English Translation, 4 pgs.
"Chinese Application Serial No. 200980148407.6, Office Action mailed Jul. 29, 2013", w/English Claims, 12 pgs.
"Chinese Application Serial No. 200980148407.6, Response filed Feb. 12, 2014 to Office Action mailed Jul. 29, 2013", w/English Claims, 11 pgs.
"European Application Serial No. 09712316.0, Office Action mailed Feb. 22, 2013", 5 pgs.
"European Application Serial No. 09712316.0, Response filed Aug. 22, 2013 to Office Action mailed Feb. 22, 2013", 10 pgs.
"European Application Serial No. 09712316.0, Response filed Feb. 13, 2012 to Search Report mailed Aug. 2, 2011", 8 pgs.
"European Application Serial No. 09824176.3, Extended European Search Report mailed Feb. 26, 2013", 4 pgs.
"European Application Serial No. 11766502.6, Extended European Search Report mailed Oct. 11, 2013", 5 pgs.
"European Application Serial No. 11766502.6, Office Action mailed Oct. 29, 2013", 1 pg.
"European Application Serial No. 11766502.6, Response filed May 7, 2014 to Office Action mailed Oct. 29, 2013", 10 pgs.
"European Application Serial No. 09712316.0, Office Action mailed Aug. 2, 2011", 5 pgs.
"International Application Serial No. PCT/US2009/001017, International Preliminary Report on Patentability mailed Sep. 2, 2010", 7 pgs.
"International Application Serial No. PCT/US2009/001017, Search Report mailed May 29, 2009", 3 pgs.
"International Application Serial No. PCT/US2009/001017, Written Opinion mailed Aug. 25, 2009", 9 pgs.
"International Application Serial No. PCT/US2009/062799, Search Report mailed Mar. 3, 2010", 3 pgs.
"International Application Serial No. PCT/US2009/062799, Written Opinion mailed Mar. 3, 2010", 3 pgs.
"International Application Serial No. PCT/US2011/030544, International Preliminary Report on Patentability mailed Oct. 11, 2012", 7 pgs.
"International Application Serial No. PCT/US2011/030544, Search Report mailed Dec. 7, 2011", 3 pgs.
"International Application Serial No. PCT/US2011/030544, Written Opinion mailed Dec. 7, 2011", 5 pgs.
"Japanese Application Serial No. 2010-546799, Office Action mailed Mar. 11, 2014", w/English Translation, 6 pgs.
"Japanese Application Serial No. 2010-546799, Office Action mailed Jul. 30, 2013", w/English Translation, 11 pgs.
"Japanese Application Serial No. 2010-546799, Response filed Oct. 23, 2013 to Office Action mailed Jul. 30, 2013", w/English Claims, 14 pgs.
"Japanese Application Serial No. 2011-534814, Office Action mailed Dec. 24, 2013", w/English Translation, 9 pgs.
"Japanese Application Serial No. 2011-534814, Response filed Mar. 24, 2014 to Office Action mailed Dec. 24, 2013", w/English Claims, 14 pgs.
"Taiwan Application Serial No. 098104986, Final Office Action mailed Mar. 28, 2013", w/English Claims, 8 pgs.
"Taiwan Application Serial No. 098104986, Office Action mailed Sep. 5, 2012", w/English Translation, 34 pgs.
"Taiwan Application Serial No. 098104986, Re-exam Brief filed Sep. 27, 2013", w/English Claims, 27 pgs.
"Taiwan Application Serial No. 098104986, Response filed Dec. 1, 2012 to Office Action mailed Sep. 5, 2012", w/English Translation, 12 pgs.
"Terrazon 3D Stacked Microcontroller with DRAM—FASTACK 3D Super-8051 Micro-controller", [Online]. Retrieved from the Internet: <URL: http://www.tezzaron.com/OtherICs/Super_8051.htm>, (link sent Oct. 2, 2007), 2 pgs.
"Terrazon 3D Stacked DRAM Bi-STAR Overview", [Online]. Retrieved from the Internet: <URL: http://www.tezzaron.com/memory/Overview_3D_DRAM.htm>, (Link sent Oct. 2, 2007), 1 pg.
"Terrazon FaStack Memory—3 D Memory Devices", [Online]. Retrieved from the Internet: <URL: http://www.tezzaron.com/memory/Overview_3D_DRAM.htm>, (Link sent Oct. 2, 2007 Downloaded Oct. 27, 2007), 3 pgs.
Gann, Keith D, "Neo-stacking technology", Irvine Sensors Corporation News Release, (Mar. 2007), 4 pgs.
U.S. Appl. No. 12/166,871, filed Jul. 2, 2008.
U.S. Appl. No. 12/176,951, filed Jul. 21, 2008.
U.S. Appl. No. 12/166,814, filed Jul. 2, 2008.
U.S. Appl. No. 12/750,448, filed Mar. 30, 2010, Apparatuses Enabling Concurrent Communication Between an Interface Die and a Plurality of Dice Stacks, Interleaved Conductive Paths in Stacked Devices, and Methods for Forming and Operating the Same.

* cited by examiner

FIG. 7B ical Field

Various embodiments described herein relate to apparatus, systems, and methods associated with semiconductor memories, including stacked-die memory architectures.

MULTI-SERIAL INTERFACE STACKED-DIE MEMORY ARCHITECTURE

RELATED APPLICATIONS

This application is a continuation of U.S. application Ser. No. 13/179,156, filed Jul. 8, 2011, now issued as U.S. Pat. No. 8,806,131, which is a continuation of U.S. application Ser. No. 12/261,942, filed Oct. 30, 2008, now issued as U.S. Pat. No. 7,978,721, which is a continuation-in-part of U.S. application Ser. No. 12/166,814 which was filed Jul. 2, 2008, now issued as U.S. Pat. No. 8,756,486, U.S. application Ser. No. 12/166,871 which was filed Jul. 2, 2008, now issued as U.S. Pat. No. 8,289,760, and U.S. application Ser. No. 12/176,951 which was filed on Jul. 21, 2008, now issued as U.S. Pat. No. 7,855,931. All of which are incorporated herein by reference in their entirety.

TECHNICAL FIELD

Various embodiments described herein relate to apparatus, systems, and methods associated with semiconductor memories, including stacked-die memory architectures.

BACKGROUND INFORMATION

Microprocessor technology has evolved at a faster rate than that of semiconductor memory technology. As a result, a mis-match in performance often exists between the modern host processor and the semiconductor memory subsystem to which the processor is mated to receive instructions and data. For example, it is estimated that some high-end servers idle three out of four clocks waiting for responses to memory requests.

In addition, the evolution of software application and operating system technology has increased demand for higher-density memory subsystems as the number of processor cores and threads continues to increase. However, current-technology memory subsystems often represent a compromise between performance and density. Higher bandwidths may limit the number of memory cards or modules that may be connected in a system without exceeding Joint Electron Device Engineering Council (JEDEC) electrical specifications.

Extensions to JEDEC interface standards such as dynamic data rate (DDR) synchronous dynamic random access memory (SDRAM) have been proposed but may be generally found lacking as to future anticipated memory bandwidths and densities. Weaknesses include lack of memory power optimization and the uniqueness of the interface between the host processor and the memory subsystem. The latter weakness may result in a need to redesign the interface as processor and/or memory technologies change.

DETAILED DESCRIPTION

Figure 1:
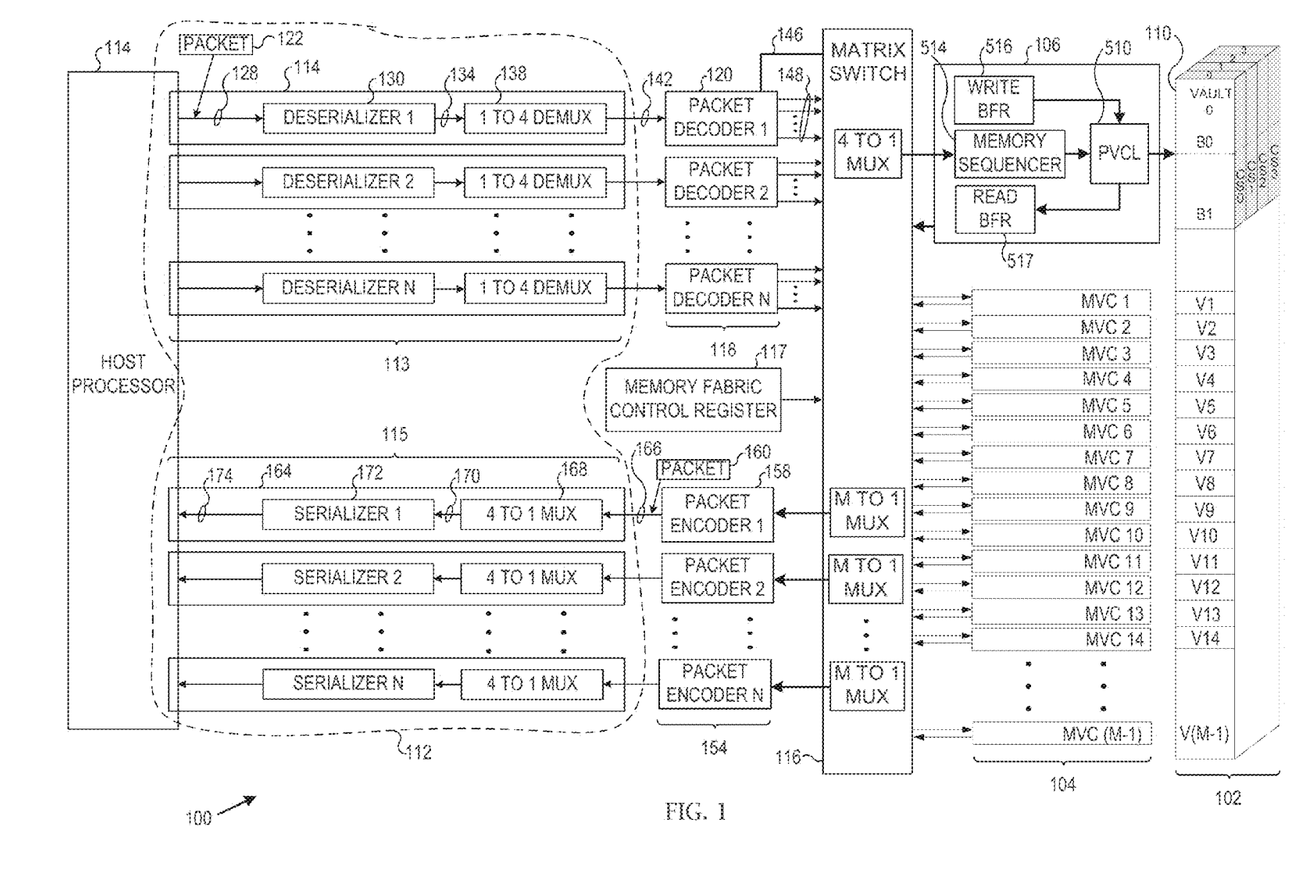
FIG. 1 is a block diagram of a memory system according to various example embodiments of the current invention.

FIG. 1 is a block diagram of a memory system 100 according to various example embodiments of the current invention. The memory system 100 operates to substantially concurrently transfer a plurality of outbound and/or inbound streams of commands, addresses, and/or data between one or more originating devices and/or destination devices (e.g., one or more processors) and a set of stacked-array memory "vaults." Increased memory system density, bandwidth, parallelism, and scalability may result.

Multi-die memory array embodiments herein aggregate control logic that is normally located on each individual memory array die in previous designs. Subsections of a stacked group of dies, referred to herein as a "memory vault," share common control logic. The memory vault architecture strategically partitions memory control logic to increase energy efficiency while providing a finer granularity of powered-on memory banks. Embodiments herein also enable a standardized host processor to memory system interface. The standardized interface may reduce re-design cycle times as memory technology evolves.

Figure 2:
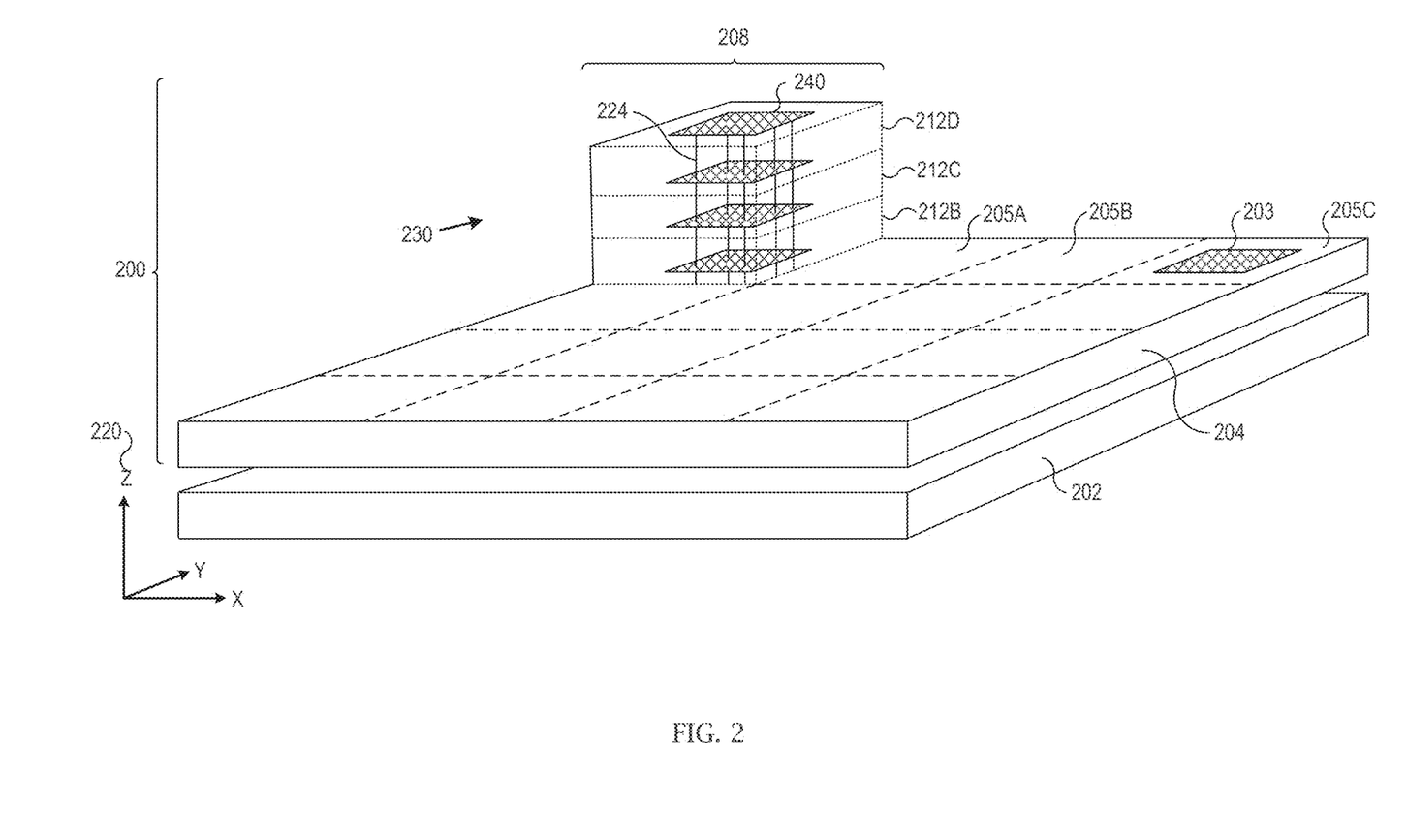
FIG. 2 is a cut-away conceptual view of a stacked-die 3D memory array stacked with a logic die according to various example embodiments.

FIG. 2 is a cut-away conceptual view of a stacked-die 3D memory array 200 stacked with a logic die 202 according to various example embodiments. The memory system 100 incorporates one or more stacks of tiled memory arrays such as the stacked-die 3D memory array 200. Multiple memory arrays (e.g., the memory array 203) are fabricated onto each of a plurality of dies (e.g., the die 204). The memory array dies are then stacked to form the stacked-die 3D memory array 200.

Each of the stacked dies is divided into multiple "tiles" (e.g., the tiles 205A, 205B, and 205C associated with the stacked die 204). Each tile (e.g., the tile 205C) may include one or more memory arrays 203. In some embodiments, each memory array 203 may be configured as one or more independent memory banks in the memory system 100. The memory arrays 203 are not limited to any particular memory technology and may include dynamic random-access memory (DRAM), static random access memory (SRAM), flash memory, etc.

A stacked set of memory array tiles 208 may include a single tile from each of the stacked dies (e.g., the tiles 212B, 212C and 212D, with the base tile hidden from view in FIG. 1). Power, address, and/or data and similar common signals may traverse the stacked set of tiles 208 in the "Z" dimension 220 on conductive paths (e.g., the conductive path 224) referred to herein as "through-wafer interconnects" (TWIs). It is noted that a TWI need not necessarily pass entirely through a particular wafer or die.

The stacked-die 3D memory array 200 is thus partitioned into a set of memory "vaults" (e.g., the memory vault 230). Each memory vault includes a stacked set of tiles (e.g., the set of tiles 208), one tile from each of a plurality of stacked dies, together with a set of TWIs to electrically interconnect the set of tiles 208. Each tile of the vault includes one or more memory arrays (e.g., the memory array 240).

The resulting set of memory vaults 102 is shown in FIG. 1. The memory system 100 also includes a plurality of memory vault controllers (MVCs) 104 (e.g., the MVC 106). Each MVC is communicatively coupled to a corresponding memory vault (e.g., the memory vault 110 of the set 102) in a one-to-one relationship. Each MVC is thus capable of communicating with a corresponding memory vault independently from communications between other MVCs and their respective memory vaults.

The memory system 100 also includes a plurality of configurable serialized communication link interfaces (SCLIs) 112. The SCLIs 112 are divided into an outbound group of SCLIs 113 (e.g., the outbound SCLI 114) and an inbound group of SCLIs 115. Each of the plurality of SCLIs 112 is capable of concurrent operation with the other SCLIs 112. Together the SCLIs 112 communicatively couple the plurality of MVCs 104 to one or more host processor(s) 114. The memory system 100 presents a highly abstracted, multi-link, high-throughput interface to the host processor(s) 114.

The memory system 100 may also include a switch 116. In some embodiments, the switch 116 may comprise a matrix or cross-connect switch. The switch 116 is communicatively coupled to the plurality of SCLIs 112 and to the plurality of MVCs 104. The switch 116 is capable of cross-connecting each SCLI to a selected MVC. The host processor(s) 114 may thus access the plurality of memory vaults 102 across the plurality of SCLIs 112 in a substantially simultaneous fashion. This architecture can provide the processor-to-memory bandwidth needed by modern processor technologies, including multi-core technologies.

The memory system 100 may also include a memory fabric control register 117 coupled to the switch 116. The memory fabric control register 117 accepts memory fabric configuration parameters from a configuration source and configures one or more components of the memory system 100 to operate according to a selectable mode. For example, the switch 116 and each of the plurality of memory vaults 102 and the plurality of MVCs 104 may normally be configured to operate independently of each other in response to separate memory requests. Such a configuration may enhance memory system bandwidth as a result of the parallelism between the SCLIs 112 and the memory vaults 102.

Alternatively, the memory system 100 may be reconfigured via the memory fabric control register 117 to cause a subset of two or more of the plurality of memory vaults 102 and a corresponding subset of MVCs to operate synchronously in response to a single request. The latter configuration may be used to access a data word that is wider than the width of a data word associated with a single vault. This technique may decrease latency, as further described below. Other configurations may be enabled by loading a selected bit pattern into the memory fabric control register 117.

Figure 3:
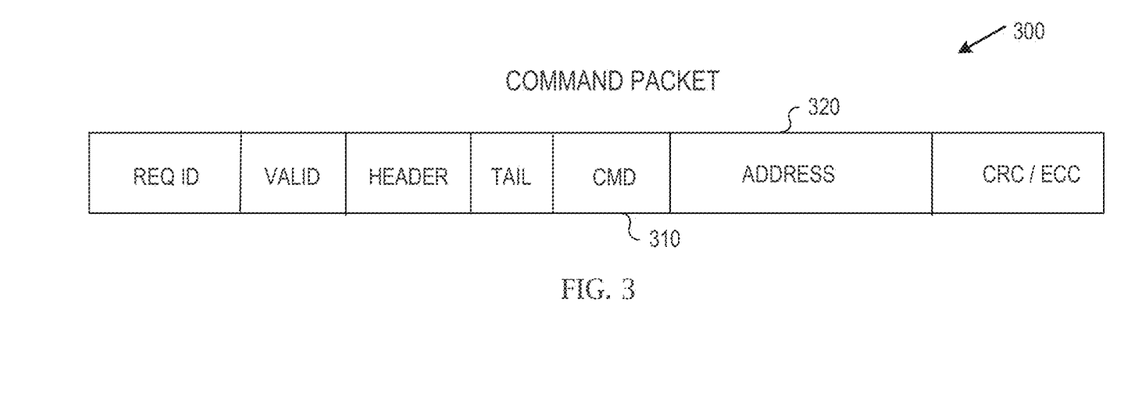
FIGS. 3 and 4 are packet diagrams showing fields associated with example packets according to various example embodiments.
Figure 4:
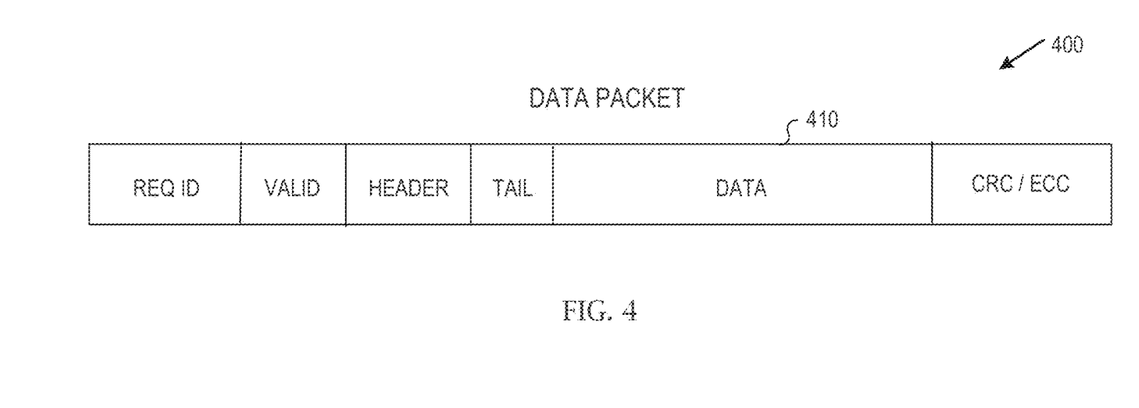

FIGS. 3 and 4 are packet diagrams showing fields associated with example packets 300 and 400, respectively, according to various example embodiments. Turning to FIG. 1 in light of FIGS. 3 and 4, the memory system 100 may also include a plurality of packet decoders 118 (e.g., the packet decoder 120) coupled to the switch 116. The host processor(s) 114 assemble an outbound packet 122 that in some embodiments may be similar in structure to the example command packet 300 or data packet 400. That is, the outbound packet 122 may contain a command field 310, an address field 320, and/or a data field 410. The host processor 114 then sends the outbound packet 122 across an outbound SCLI (e.g., the outbound SCLI 114) to the packet decoder 120 in a manner further explained below.

The outbound SCLI 114 may include a plurality of outbound differential pair serial paths (DPSPs) 128. The DPSPs 128 are communicatively coupled to the host processor(s) 114 and may collectively transport the outbound packet 122. That is, each DPSP of the plurality of outbound DPSPs 128 may transport a first data rate outbound sub-packet portion of the outbound packet 122 at a first data rate.

The outbound SCLI 114 may also include a deserializer 130 coupled to the plurality of outbound DPSPs 128. The deserializer 130 converts each first data rate outbound sub-packet portion of the outbound packet 122 to a plurality of second data rate outbound sub-packets. The plurality of second data rate outbound sub-packets is sent across a first plurality of outbound single-ended data paths (SEDPs) 134 at a second data rate. The second data rate is slower than the first data rate.

The outbound SCLI 114 may also include a demultiplexer 138 communicatively coupled to the deserializer 130. The demultiplexer 138 converts each of the plurality of second data rate outbound sub-packets to a plurality of third data rate outbound sub-packets. The plurality of third data rate outbound sub-packets is sent across a second plurality of outbound SEDPs 142 to the packet decoder 120 at a third data rate. The third data rate is slower than the second data rate.

The packet decoder 120 receives the outbound packet 122 and extracts the command field 310 (e.g., of the example packet 300), the address field 320 (e.g., of the example packet 300), and/or the data field (e.g., of the example packet 400). In some embodiments, the packet decoder 120 decodes the address field 320 to determine a corresponding set of memory vault select signals. The packet decoder 120 presents the set of memory vault select signals to the switch 116 on an interface 146. The vault select signals cause the input data paths 148 to be switched to the MVC 106 corresponding to the outbound packet 122.

Turning now to a discussion of the inbound data paths, the memory system 100 may include a plurality of packet encoders 154 (e.g., the packet encoder 158) coupled to the switch 116. The packet encoder 158 may receive an inbound memory command, an inbound memory address, and/or inbound memory data from one of the plurality of MVCs 104 via the switch 116. The packet encoder 158 encodes the inbound memory command, address, and/or data into an inbound packet 160 for transmission across an inbound SCLI 164 to the host processor(s) 114.

In some embodiments, the packet encoder 158 may segment the inbound packet 158 into a plurality of third data rate inbound sub-packets. The packet encoder 158 may send the plurality of third data rate inbound sub-packets across a first plurality of inbound single-ended data paths (SEDPs) 166 at a third data rate. The memory system 100 may also include a multiplexer 168 communicatively coupled to the packet encoder 158. The multiplexer 168 may multiplex each of a plurality of subsets of the third data rate inbound sub-packets into a second data rate inbound sub-packet. The multiplexer 168 sends the second data rate inbound sub-packets across a second plurality of inbound SEDPs 170 at a second data rate that is faster than the third data rate.

The memory system 100 may further include a serializer 172 communicatively coupled to the multiplexer 168. The serializer 172 aggregates each of a plurality of subsets of the second data rate inbound sub-packets into a first data rate inbound sub-packet. The first data rate inbound sub-packets are sent to the host processor(s) 114 across a plurality of inbound differential pair serial paths (DPSPs) 174 at a first data rate that is faster than the second data rate. Command, address, and data information is thus transferred back and forth between the host processor(s) 114 and the MVCs 104 across the SCLIs 112 via the switch 116. The MVCs 104, the SCLIs 112, and the switch 116 are fabricated on the logic die 202.

Figure 5:
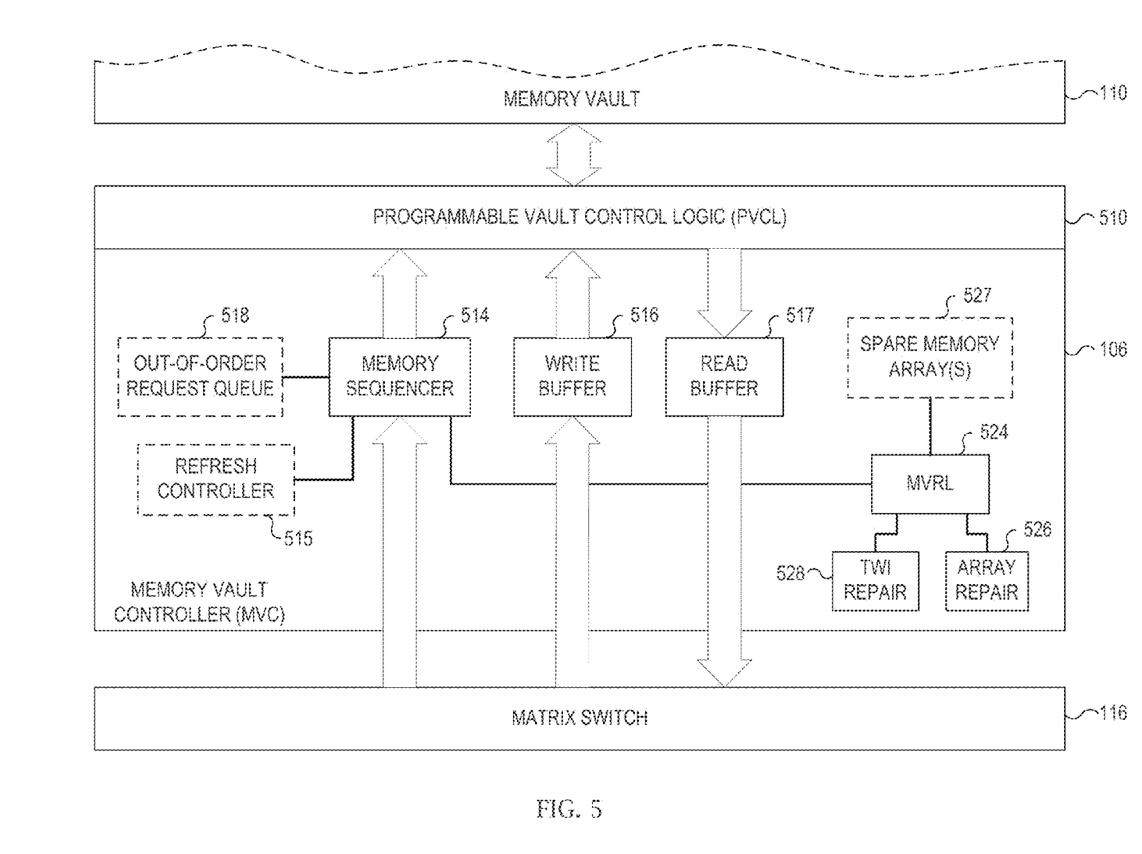
FIG. 5 is a block diagram of a memory vault controller and associated modules according to various example embodiments.

FIG. 5 is a block diagram of an MVC (e.g., the MVC 106) and associated modules according to various example embodiments. The MVC 106 may include a programmable vault control logic (PVCL) component (e.g., the PVCL 510). The PVCL 510 interfaces the MVC 106 to the corresponding memory vault (e.g., the memory vault 110). The PVCL 510 generates one or more bank control signals and/or timing signals associated with the corresponding memory vault 110.

The PVCL 510 may be configured to adapt the MVC 106 to a memory vault 110 of a selected configuration or a selected technology. Thus, for example, the memory system 100 may initially be configured using currently-available DDR2 DRAMs. The memory system 100 may subsequently be adapted to accommodate DDR3-based memory vault technology by reconfiguring the PVCL 510 to include DDR3 bank control and timing logic.

The MVC 106 may also include a memory sequencer 514 communicatively coupled to the PVCL 510. The memory sequencer 514 performs a memory technology dependent set of operations based upon the technology used to implement the associated memory vault 110. The memory sequencer 514 may, for example, perform command decode operations, memory address multiplexing operations, memory address demultiplexing operations, memory refresh operations, memory vault training operations, and/or memory vault prefetch operations associated with the corresponding memory vault 110. In some embodiments, the memory sequencer 514 may comprise a DRAM sequencer. In some embodiments, memory refresh operations may originate in a refresh controller 515.

The memory sequencer 514 may be configured to adapt the memory system 100 to a memory vault 110 of a selected configuration or technology. For example, the memory sequencer 514 may be configured to operate synchronously with other memory sequencers associated with the memory system 100. Such a configuration may be used to deliver a wide data word from multiple memory vaults to a cache line (not shown) associated with the host processor(s) 114 in response to a single cache line request.

The MVC 106 may also include a write buffer 516. The write buffer 516 may be coupled to the PVCL 510 to buffer data arriving at the MVC 106 from the host processor(s) 114. The MVC 106 may further include a read buffer 517. The read buffer 517 may be coupled to the PVCL 510 to buffer data arriving at the MVC 106 from the corresponding memory vault 110.

The MVC 106 may also include an out-of-order request queue 518. The out-of-order request queue 518 establishes an ordered sequence of read and/or write operations to the plurality of memory banks included in the memory vault 110. The ordered sequence is chosen to avoid sequential operations to any single memory bank in order to reduce bank conflicts and to decrease read-to-write turnaround time.

The MVC 106 may also include a memory vault repair logic (MVRL) component 524. The MVRL 524 may perform defective memory array address remapping operations using array repair logic 526. The array repair logic 526 may remap requests to redundant cells or arrays of cells located on memory vault dies (e.g., on the stacked die 204 of FIG. 2) and/or on the logic die 202 (e.g., the spare array 527). The MVRL 524 may also perform TWI repair operations associated with the corresponding memory vault 110 using TWI repair logic 528.

Any of the components previously described may be implemented in a number of ways, including embodiments in hardware, software, firmware, or combinations thereof. It is noted that "software" in this context refers to statutory software structures and not to mere software listings.

Thus, the memory system 100; the memory arrays 200, 203, 240, 527; the die 202, 204; the tiles 205A, 205B, 205C, 208, 212B, 212C, 212D; the "Z" dimension 220; the paths 224, 148; the memory vaults 230, 102, 110; the MVCs 104, 106; the SCLIs 112, 113, 114, 115, 164; the processor(s) 114; the switch 116; the register 117; the packets 300, 400, 122, 160; the packet decoders 118, 120; the fields 310, 320, 410; the DPSPs 128, 174; the deserializer 130; the SEDPs 134, 142, 166, 170; the demultiplexer 138; the interface 146; the packet encoders 154, 158; the multiplexer 168; the serializer 172; the PVCL 510; the memory sequencer 514; the refresh controller 515; the buffers 516, 517; the out-of-order request queue 518; the MVRL 524; the array repair logic 526; and the TWI repair logic 528 may all be characterized as "modules" herein.

The modules may include hardware circuitry, optical components, single or multi-processor circuits, memory circuits, software program modules and objects, firmware, and combinations thereof, as desired by the architect of the memory system 100 and as appropriate for particular implementations of various embodiments.

The apparatus and systems of various embodiments may be useful in applications other than a high-density, multi-link, high-throughput semiconductor memory subsystem. Thus, various embodiments of the invention are not to be so limited. The illustrations of the memory system 100 are intended to provide a general understanding of the structure of various embodiments. They are not intended to serve as a complete description of all the elements and features of apparatus and systems that might make use of the structures described herein.

The novel apparatus and systems of various embodiments may comprise or be incorporated into electronic circuitry used in computers, communication and signal processing circuitry, single-processor or multi-processor modules, single or multiple embedded processors, multi-core processors, data switches, and application-specific modules including multilayer, multi-chip modules. Such apparatus and systems may further be included as sub-components within a variety of electronic systems, such as televisions, cellular telephones, personal computers (e.g., laptop computers, desktop computers, handheld computers, tablet computers, etc.), workstations, radios, video players, audio players (e.g., MP3 (Motion Picture Experts Group, Audio Layer 3) players), vehicles, medical devices (e.g., heart monitor, blood pressure monitor, etc.), set top boxes, and others. Some embodiments may include a number of methods.

Figure 6A:
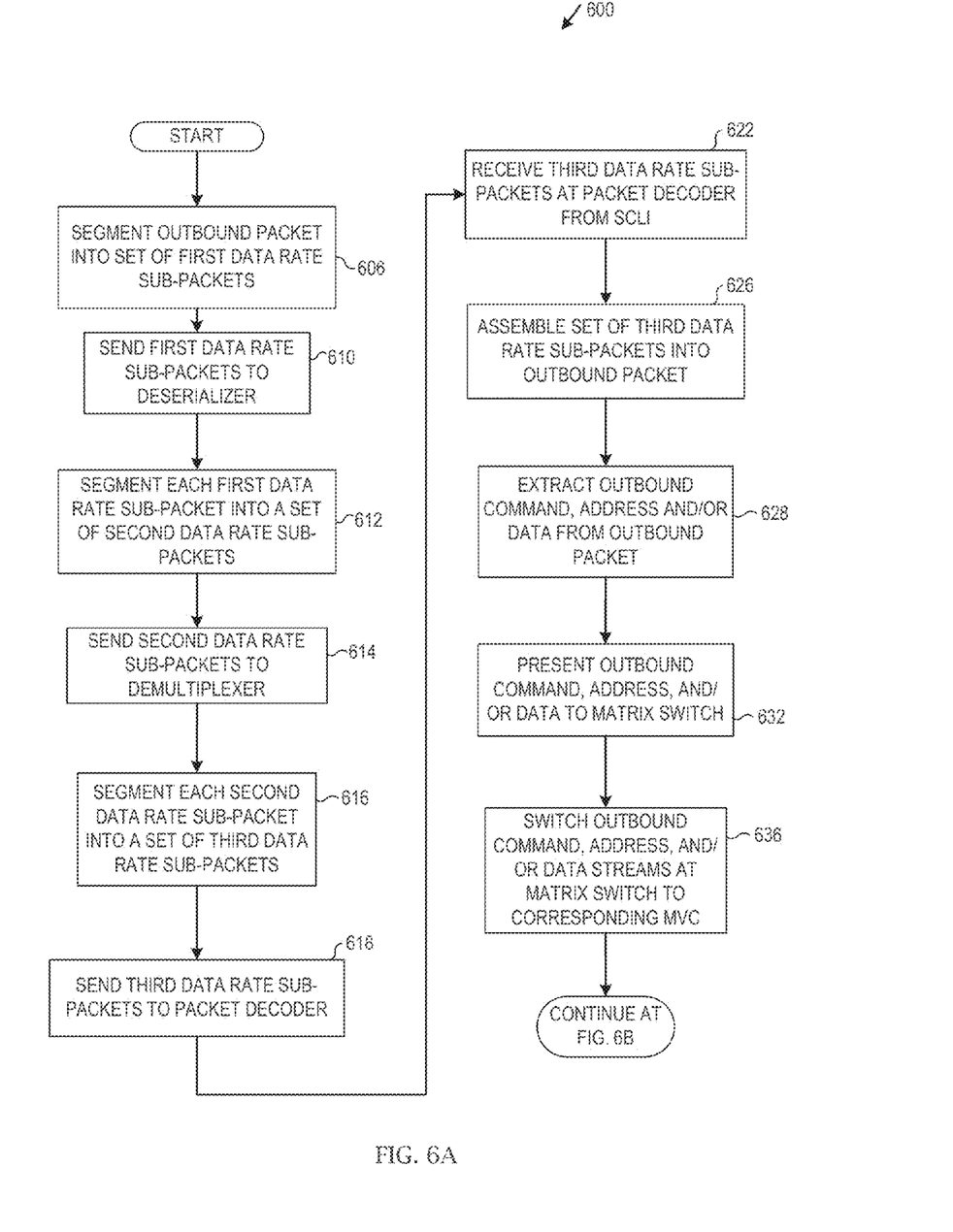
FIGS. 6A and 6B are flow diagrams illustrating a method according to various example embodiments.
Figure 6B:
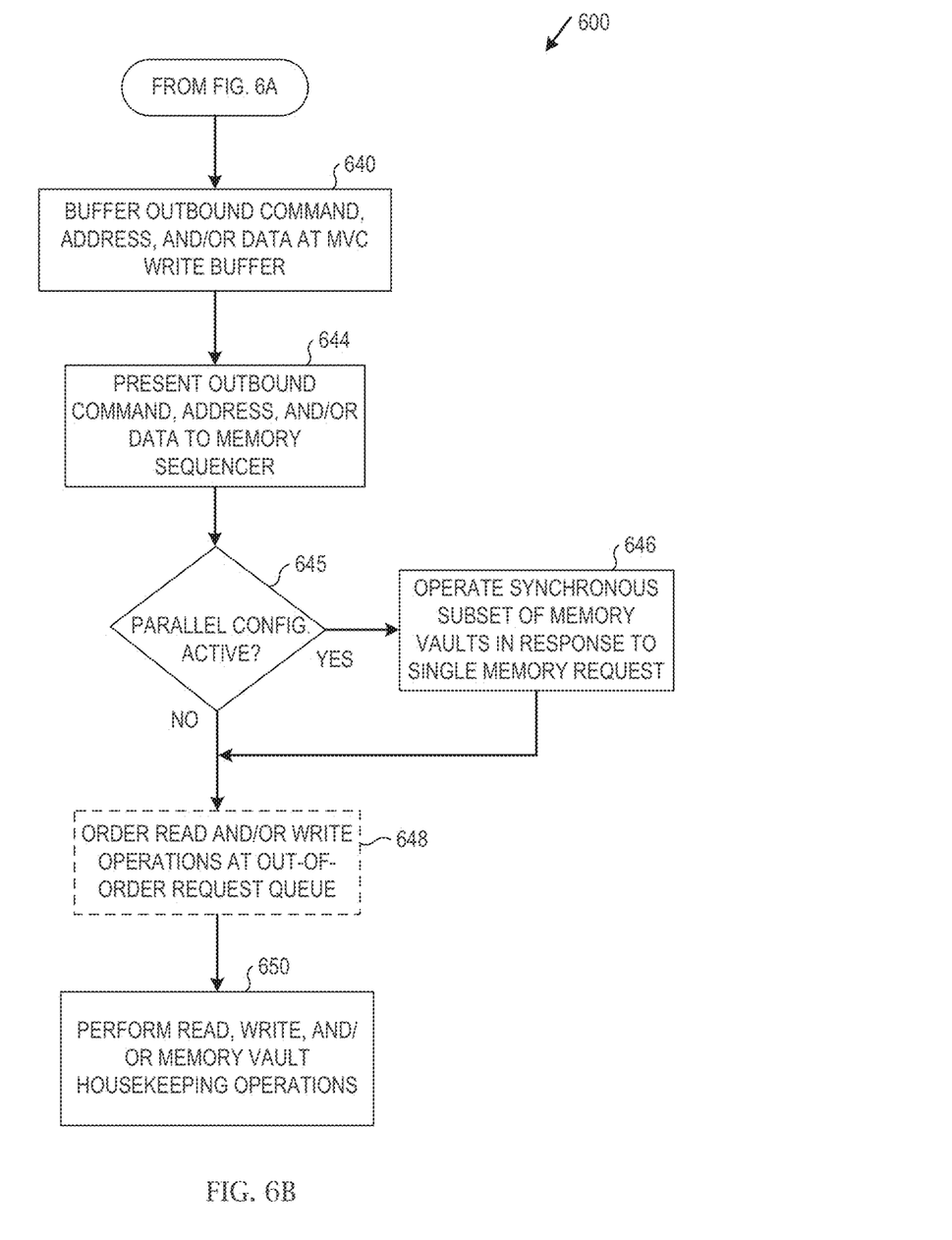

FIGS. 6A and 6B are flow diagrams illustrating a method 600 according to various example embodiments. The method 600 includes substantially concurrently transferring a plurality of outbound streams of commands, addresses, and/or data from one or more originating devices (e.g., the processor(s) 114 of FIG. 1) to a plurality of memory vaults (e.g., the memory vaults 102 of FIG. 1). The streams may be packetized and transported from the originating device(s) across a plurality of outbound SCLIs (e.g., the outbound SCLIs 113 of FIG. 1) to a set of packet decoders (e.g., the packet decoders 118 of FIG. 1). The command, address, and data streams may then be switched to corresponding MVCs (e.g., the MVCs 104) for execution and/or writing to or reading from the memory vaults.

The method 600 may commence at block 606 with segmenting an outbound packet into a set of first data rate sub-packet portions at the originating device. In some embodiments, the originating device may include one or more processors. In some embodiments, the originating device may include a category of devices capable of direct memory access (DMA) such as a graphics controller. The packet may carry one or more outbound memory subsystem commands, addresses, or data fields to be written to one or more memory subsystem locations.

The method 600 may continue at block 610 with sending each of the first data rate sub-packets from the originating device (e.g., from a selected processor) to a deserializer (e.g., the deserializer 130 of FIG. 1). The first data rate sub-packets may be sent across a plurality of DPSPs (e.g., the DPSPs 128 of FIG. 1) corresponding to a selected outbound SCLI (e.g., the outbound SCLI 114 of FIG. 1) at a first data rate. The method 600 may also include segmenting each of the first data rate sub-packets into a plurality of second data rate sub-packets at the deserializer, at block 612.

The method 600 may further include sending each of the second data rate sub-packets from the deserializer to a demultiplexer (e.g., the demultiplexer 138 of FIG. 1) at a second data rate slower than the first data rate, at block 614. At the demultiplexer, each of the second data rate sub-packets may be segmented into a set of third data rate sub-packets, as depicted at block 616. The method 600 may also include sending the third data rate sub-packets to a packet decoder at a third data rate slower than the second data rate, at block 618.

The method 600 may continue at block 622 with receiving the third data rate sub-packets at the packet decoder from the selected SCLI. The method 600 may include assembling the set of third data rate sub-packets into the outbound packet, at block 626. The method 600 may also include extracting at least one of the outbound command, the outbound address, or the outbound data from the packet, at block 628.

The method 600 may also include presenting the outbound command, address, or data to the switch, at block 632. The method 600 may further include concurrently switching an outbound command, address, and/or data associated with each stream at the switch, at block 636. The outbound command, address, and/or data associated with each stream is switched to a destination MVC (e.g., the MVC 106 of FIG. 1) associated with a corresponding memory vault (e.g., the memory vault 110 of FIG. 1).

The method 600 may continue at block 640 with buffering the outbound command, address, and/or data at a write buffer component of the MVC (e.g., the write buffer 516 of FIG. 1). The method 600 may include presenting the outbound command, address, and/or data to a memory sequencer (e.g., the memory sequencer 514 of FIG. 1) for processing, at block 644.

In some embodiments, the method 600 may optionally include determining whether the memory subsystem has been configured to operate in a synchronous parallel mode, at block 645. If so, the method 600 may include operating a synchronous subset of the memory vaults in response to a single memory request, at block 646. Such operation may be used to decrease access latency by synchronously transferring a wide data word of a width that is a multiple of a single memory vault word length. The resulting wide data word width corresponds to the number of memory vaults in the synchronous subset of vaults.

The method 600 may optionally include ordering read and/or write operations to a plurality of memory banks associated with a corresponding memory vault at an out-of-order request queue component of the memory sequencer (e.g., the out-of-order request queue 518 of FIG. 5), at block 648. The ordering may operate to avoid multiple sequential reads and/or writes to any single memory bank and may thereby reduce bank conflicts and decrease read-to-write turnaround times.

The method 600 may conclude at block 650 with performing data write operations to write the outbound data to the corresponding memory vault, data read operations to read data from the corresponding memory vault, and/or memory vault housekeeping operations. The data write operations, data read operations, and/or housekeeping operations may be performed independently from concurrent operations associated with other MVCs coupled to other memory vaults.

Figure 7A:
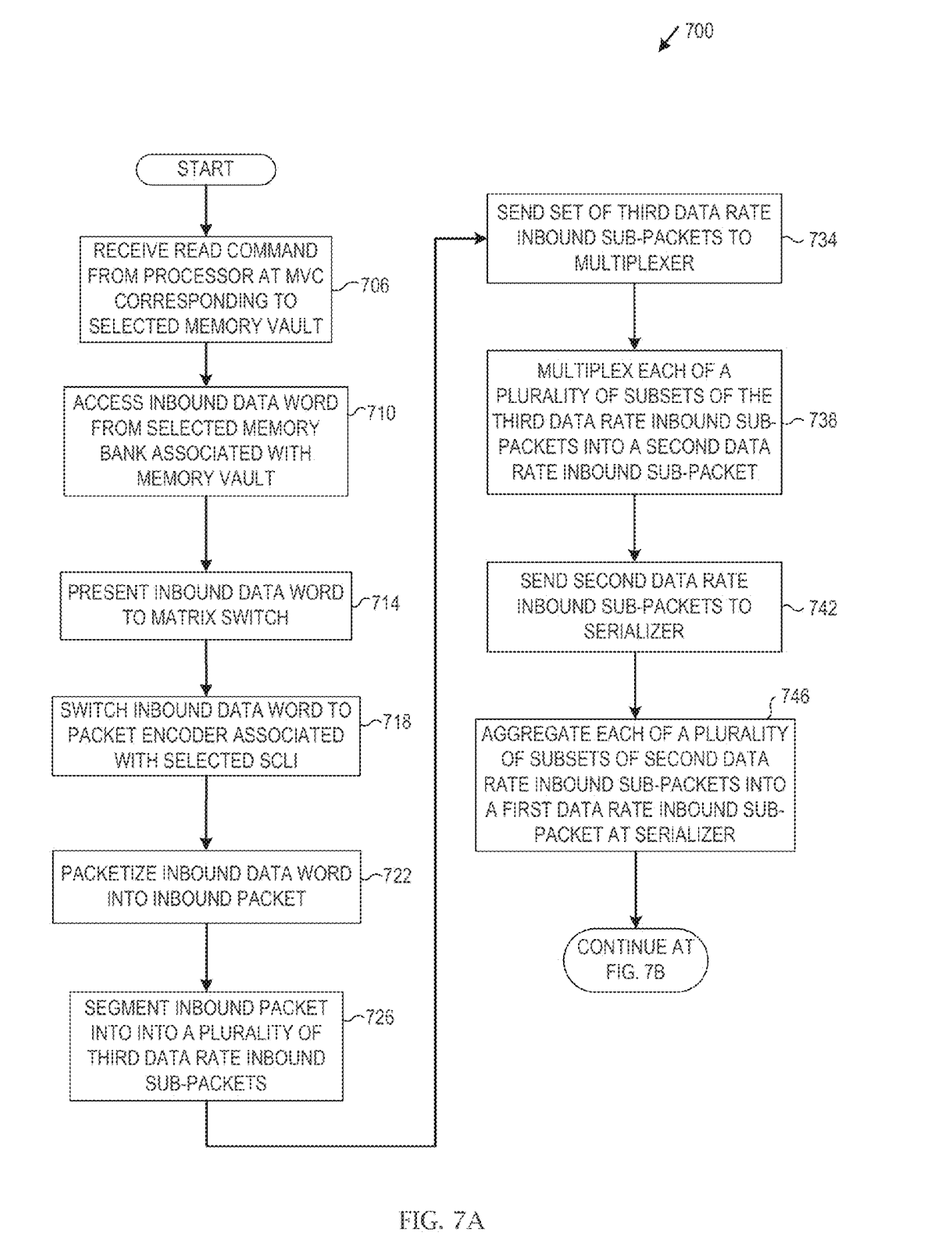
FIGS. 7A and 7B are flow diagrams illustrating a method according to various example embodiments.
Figure 7B:
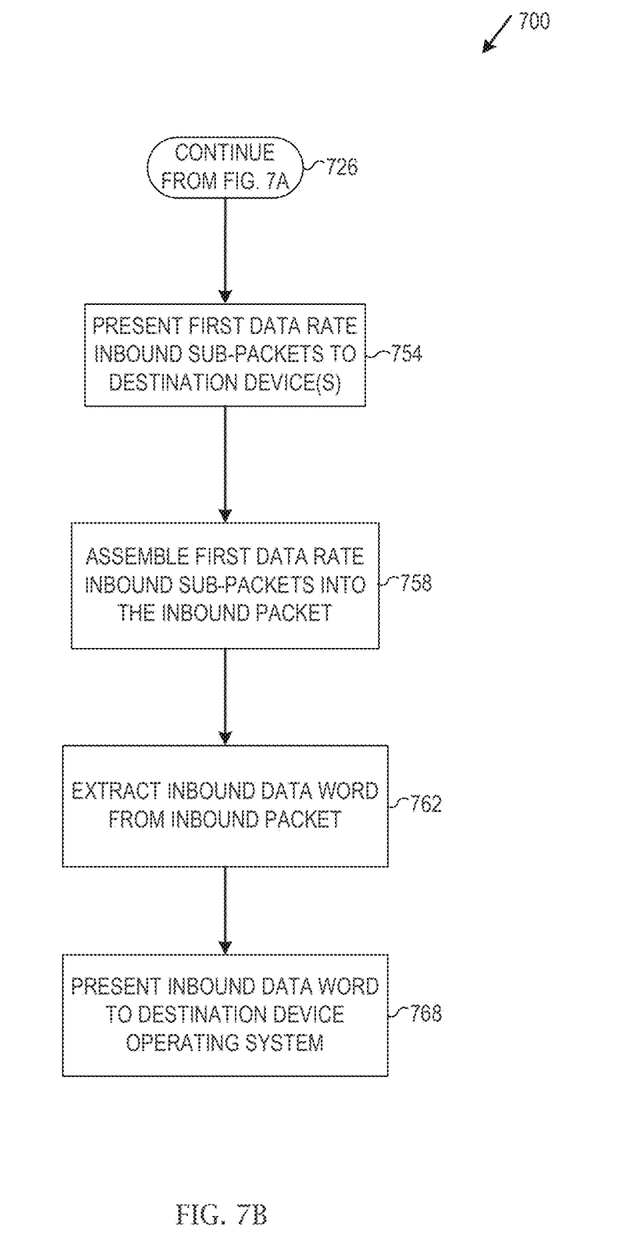

FIGS. 7A and 7B are flow diagrams illustrating a method 700 according to various example embodiments. The method 700 includes substantially concurrently transferring a plurality of inbound streams of packetized commands, addresses, and/or data from a plurality of memory vaults (e.g., the memory vaults 102 of FIG. 1) to one or more destination devices (e.g., the processor(s) 114 of FIG. 1). The command, address, and/or data streams may be read from the memory vaults by a set of MVCs associated with the memory vaults (e.g., the MVCs 104 of FIG. 1) and/or may originate at the MVCs. The streams may be switched through a switch (e.g., the switch 116 of FIG. 1) to a set of packet encoders (e.g., the packet encoders 154 of FIG. 1). The streams may then be packetized and transported to the destination device(s) across a plurality of inbound SCLIs (e.g., the inbound SCLIs 115 of FIG. 1).

The method 700 may commence at block 706 with receiving a read command from a processor at an MVC (e.g., the MVC 106 of FIG. 1) corresponding to a selected memory vault (e.g., the memory vault 110 of FIG. 1). It is noted that in some embodiments, the processor and the destination device may be the same device; however this need not be the case. The method 700 may continue at block 710 with accessing an inbound data word from a selected memory bank associated with the memory vault using a memory sequencer (e.g., the memory sequencer 514 of FIG. 1) associated with the MVC. The method 700 may include presenting the inbound data word to the switch, at block 714.

The method 700 may also include switching the inbound data word to a packet encoder (e.g., the packet encoder 158 of FIG. 1) associated with a selected SCLI (e.g., the inbound SCLI 164) using the switch, at block 718. The method 700 may further include packetizing the inbound data word into an inbound packet using the packet encoder, at block 722.

The method 700 may continue at block 726 with segmenting the inbound packet into a plurality of third data rate inbound sub-packets. The method 700 may include sending the plurality of third data rate inbound sub-packets to a multiplexer (e.g., the multiplexer 168 of FIG. 1) at a third data rate, at block 734. The method 700 may also include multiplexing each of a plurality of subsets of the third data rate inbound sub-packets into a second data rate inbound sub-packet using the multiplexer, at block 738. The method 700 may further include sending the second data rate inbound sub-packets to a serializer (e.g., the serializer 172 of FIG. 1) at a second data rate, at block 742.

The method 700 may continue at block 746 with aggregating each of a plurality of subsets of the second data rate inbound sub-packets into a first data rate inbound sub-packet using the serializer. The method 700 may include presenting the first data rate inbound sub-packets to the destination device(s), at block 754. The method 700 may also include assembling the first data rate inbound sub-packets into the inbound packet, at block 758. The method 700 may conclude with extracting the inbound data word from the inbound packet, at block 762, and presenting the inbound data word to an operating system associated with the destination device(s), at block 768.

It is noted that the activities described herein may be executed in an order other than the order described. The various activities described with respect to the methods identified herein may also be executed in repetitive, serial, and/or parallel fashion.

A software program may be launched from a computer-readable medium in a computer-based system to execute functions defined in the software program. Various programming languages may be employed to create software programs designed to implement and perform the methods disclosed herein. The programs may be structured in an object-oriented format using an object-oriented language such as Java or C++. Alternatively, the programs may be structured in a procedure-oriented format using a procedural language, such as assembly or C. The software components may communicate using well-known mechanisms, including application program interfaces, inter-process communication techniques, and remote procedure calls, among others. The teachings of various embodiments are not limited to any particular programming language or environment.

The apparatus, systems, and methods described herein may operate to substantially concurrently transfer a plurality of streams of commands, addresses, and/or data between one or more originating and/or destination devices (e.g., one or more processors) and a set of stacked-array memory vaults. Increased memory system density, bandwidth, parallelism, and scalability may result.

By way of illustration and not of limitation, the accompanying figures show specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense.

Such embodiments of the inventive subject matter may be referred to herein individually or collectively by the term "invention" merely for convenience and without intending to voluntarily limit this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments and other embodiments not specifically described herein will be apparent to those of skill in the art upon studying the above description.

The Abstract of the Disclosure is provided to comply with 37 C.F.R. §1.72(b) requiring an abstract that will allow the reader to quickly ascertain the nature of the technical disclosure. It is submitted with the understanding that it will not be used to interpret or limit the scope or meaning of the claims. In the foregoing Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing on its own as a separate embodiment.

What is claimed is:

1. A memory system, comprising:
   a plurality of memory vaults comprising a stacked plurality of tiled memory arrays, each memory vault comprising a stacked plurality of memory array die sections;
   a plurality of memory vault controllers (MVCs), each MVC coupled to a corresponding one of the plurality of memory vaults in a one-to-one relationship to communicate with the corresponding memory vault independently from communications between others of the plurality of MVCs and memory vaults corresponding to the others of the plurality of MVCs; and
   a plurality of configurable serialized communication link interfaces (SCLIs) to communicatively couple the plurality of MVCs to at least one of an originating device or a destination device, wherein at least one of the one of the plurality of SCLIs includes a differential pair serial path coupled to the originating device, a deserializer coupled to the differential pair serial path, and a demultiplexer communicatively coupled to the deserializer.

2. The memory system of claim 1, wherein the stacked plurality of memory array die sections comprises a single tile from each of the stacked plurality of tiled memory arrays.

3. The memory system of claim 1, wherein the plurality of memory array die sections corresponding to each memory vault are interconnected using through-wafer interconnects (TWIs).

4. The memory system of claim 1, further comprising:
   a switch coupled to the plurality of SCLIs and to the plurality of MVCs to cross-connect a selected SCLI to a selected MVC.

5. A memory system, comprising:
   a plurality of memory vaults comprising a stacked plurality of tiled memory arrays, each memory vault comprising a stacked plurality of memory array die sections;
   a plurality of memory vault controllers (MVCs), each MVC coupled to a corresponding one of the plurality of memory vaults in a one-to-one relationship to communicate with the corresponding memory vault independently from communications between others of the plurality of MVCs and memory vaults corresponding to the others of the plurality of MVCs; and
   a plurality of configurable serialized communication link interfaces (SCLIs) to communicatively couple the plurality of MVCs to at least one of an originating device or a destination device
   a packet decoder to receive an outbound packet sent from the originating device across an outbound one of the plurality of SCLIs, to extract at least one of an outbound memory command, an outbound memory address, or an outbound memory data field from the outbound packet; and
   a packet encoder to receive at least one of an inbound memory command, an inbound memory address, or inbound memory data from one of the plurality of MVCs and to encode the inbound memory address or the inbound memory data into an inbound packet for transmission across an inbound one of the plurality of SCLIs to the destination device.

6. The memory system of claim 4, further comprising:
a control register coupled to the switch to accept configuration parameters from a configuration source and to configure the switch to operate according to a selectable mode.

7. The memory system of claim 6, wherein the selectable mode includes at least one of operating the plurality of memory vaults synchronously in response to at least one request or operating the plurality of memory vaults asynchronously in response to at least one request.

8. The memory system of claim 1, an outbound one of the plurality of SCLIs further comprising a plurality of outbound differential pair serial paths (DPSPs) coupled to the originating device to transport an outbound packet containing at least one of command information, address information, or data across the outbound SCLI, each of the plurality of outbound DPSPs to transport a first data rate outbound sub-packet portion of the outbound packet at a first data rate, the outbound one of the plurality of SCLIs to convert each first data rate outbound sub-packet portion of the outbound packet to a plurality of second data rate outbound sub-packets for transmission across a first plurality of outbound single-ended data paths (SEDPs) at a second data rate, the second data rate slower than the first data rate and the unbound one of the plurality of SCLIs to convert each of the plurality of second data rate outbound sub-packets to a plurality of third data rate outbound sub-packets for transmission across a second plurality of outbound SEDPs to a packet decoder at a third data rate, the third data rate slower than the second data rate.

9. The memory system of claim 1, further comprising:
a packet encoder communicatively coupled to the switch to packetize at least one of command information, address information, or data received from an MVC associated with the selected memory vault for transmission across an inbound one of the plurality of SCLIs to the destination device, to segment a resulting inbound packet into a plurality of inbound sub-packets, and to send the inbound sub-packets across a first plurality of inbound data paths (SEDPs);
a multiplexer communicatively coupled to the packet encoder to multiplex the plurality of inbound sub-packets into multiplexed sub-packets; and
a serializer communicatively coupled to the multiplexer to aggregate the multiplexed sub-packets.

10. The memory system of claim 1, each MVC further comprising:
a programmable vault control logic (PVCL) component to interface the MVC to the corresponding memory vault;
a memory sequencer coupled to the PVCL, the memory sequencer to perform at least one of command decode operations, memory address multiplexing operations, memory address demultiplexing operations, memory refresh operations, memory vault training operations, or memory vault prefetch operations associated with the corresponding memory vault;
a write buffer coupled to the PVCL to buffer data arriving at the MVC from the originating device; and
a read buffer coupled to the PVCL to buffer data arriving at the MVC from the corresponding memory vault.

11. The memory system of claim 10, wherein the memory sequencer comprises a dynamic random access memory (DRAM) sequencer.

12. The memory system of claim 10, wherein the PVCL is configured according to specifications associated with a memory vault of at least one of a selected configuration or a selected technology.

13. The memory system of claim 10, wherein the memory sequencer is configured to perform the command decode operations, memory address multiplexing operations, memory address demultiplexing operations, memory refresh operations, memory vault training operations, or memory vault prefetch operations according to specifications associated with a memory vault of at least one of a selected configuration or a selected technology.

14. The memory system of claim 10, further comprising:
an out-of-order request queue associated with each MVC, the out-of-order request queue to order at least one of read operations to a plurality of memory banks or write operations to the plurality of memory banks to avoid sequential operations to any single memory bank.

15. The memory system of claim 1, each MVC further comprising:
a memory vault repair logic (MVRL) component to perform at least one of defective memory array address remapping operations or defective through-wafer interconnect (TWI) repair operations associated with the corresponding memory vault.

16. A memory system comprising:
a memory vault;
a memory vault controller configured to communicate with the memory vault;
a communication link interface configured to communicatively couple the memory vault controller at least one of an originating device or a destination device;
a switch configured to connect the communication link interface to the memory vault controller;
a packet decoder coupled to the switch to receive an outbound packet sent from the originating device across an outbound of the communication link interface, to extract at least one of an outbound memory command, an outbound memory address, or an outbound memory data field from the outbound packet, and to present a set of select signals to the switch; and
a packet encoder coupled to the switch to receive at least one of an inbound memory command, an inbound memory address, or inbound memory data from the memory vault controller, and to encode the inbound memory address or the inbound memory data into an inbound packet for transmission across an inbound of the communication link interface to the destination device.

17. The memory system of claim 16, wherein the memory vault includes stacked memory arrays.

18. The memory system of claim 17, further comprising through-wafer interconnects coupled to the stacked memory arrays.

19. A method comprising:
concurrently transferring a plurality of streams of commands, addresses, or data across a communication link interface, wherein the communication link interface including a differential pair serial path, a deserializer coupled to the differential pair serial path, and a demultiplexer communicatively coupled to the deserializer;
concurrently switching at least one of a command, an address, or data associated with each stream to a corresponding destination memory vault controller (MVC) associated with a corresponding memory vault; and
performing at least one of data write operations to write the outbound data to the corresponding memory vault, data read operations to read data from the corresponding memory vault, or memory vault housekeeping operations associated with the corresponding memory vault, the data write operations, data read operations, or housekeeping operations to be performed independently from concurrent operations associated with others of a plurality of MVCs coupled to a corresponding plurality of memory vaults.

20. The method of claim 19, further comprising:

segmenting a packet into a plurality of first data rate sub-packet portions of the packet, the packet containing at least one memory subsystem command, at least one memory subsystem address, or data to be written to at least one memory subsystem location or to be read from at least one memory subsystem location;

sending each of the first data rate sub-packets at a first data rate;

segmenting each of the first data rate sub-packets into a plurality of second data rate sub-packets;

sending each of the second data rate sub-packets at a second data rate slower than the first data rate;

segmenting each of the second data rate sub-packet into a plurality of third data rate sub-packets; and sending the third data rate sub-packets to a packet decoder at a third data rate slower than the second data rate.

* * * * *